United States Patent [19]

D'Amico et al.

[11] Patent Number: 5,606,729
[45] Date of Patent: Feb. 25, 1997

[54] METHOD AND APPARATUS FOR IMPLEMENTING A RECEIVED SIGNAL QUALITY MEASUREMENT IN A RADIO COMMUNICATION SYSTEM

[75] Inventors: Thomas V. D'Amico, Boca Raton, Fla.; Jheroen Dorenbosch, Waxahachie, Tex.

[73] Assignee: Motorola, Inc., Schaumburg, Ill.

[21] Appl. No.: 493,041

[22] Filed: Jun. 21, 1995

[51] Int. Cl.$^6$ .................................................. H04B 17/00
[52] U.S. Cl. ...................... 455/67.1; 455/33.1; 455/54.1; 455/226.2
[58] Field of Search .............................. 455/9, 33.1, 50.1, 455/52.1, 54.1, 56.1, 63, 65, 67.1, 67.3, 67.4, 226.1, 226.2, 226.3; 370/77, 95.1, 95.3, 98; 375/224, 227

[56] References Cited

U.S. PATENT DOCUMENTS

| | | | |
|---|---|---|---|
| 4,088,948 | 5/1978 | Miedema | 455/67.3 |
| 4,875,038 | 10/1989 | Siwiak et al. | |
| 5,038,399 | 8/1991 | Bruckert | 455/67.1 |
| 5,168,493 | 12/1992 | Nelson et al. | |
| 5,222,250 | 6/1993 | Cleveland et al. | 455/56.1 |
| 5,386,495 | 1/1995 | Wong et al. | 455/67.1 |

*Primary Examiner*—Andrew Faile
*Assistant Examiner*—Nguyen Vo
*Attorney, Agent, or Firm*—R. Louis Breeden

[57] ABSTRACT

A method and apparatus implements a signal quality measurement (706) in a radio communication system for delivering a message (528) to a subscriber unit (122) in a coverage zone (402). In a fixed portion (102) of the system, for each coverage zone (402) of a group including the coverage zone (402) and other coverage zones (402) that are first tier co-channel interferers thereof, a silence slot is assigned in one of a plurality of synchronized signal quality measurement (SQM) slots. The assignment is such that within the group no two coverage zones (402) have the silence slot assigned to an identical one of the SQM slots. The fixed portion (102) transmits a silent signal from selected ones of the coverage zones (402) of the group in the silence slot assigned thereto, and transmits a predetermined signal from the selected ones in a remainder of the SQM slots not assigned thereto as the silence slot, and thereafter transmits the message (528).

27 Claims, 9 Drawing Sheets

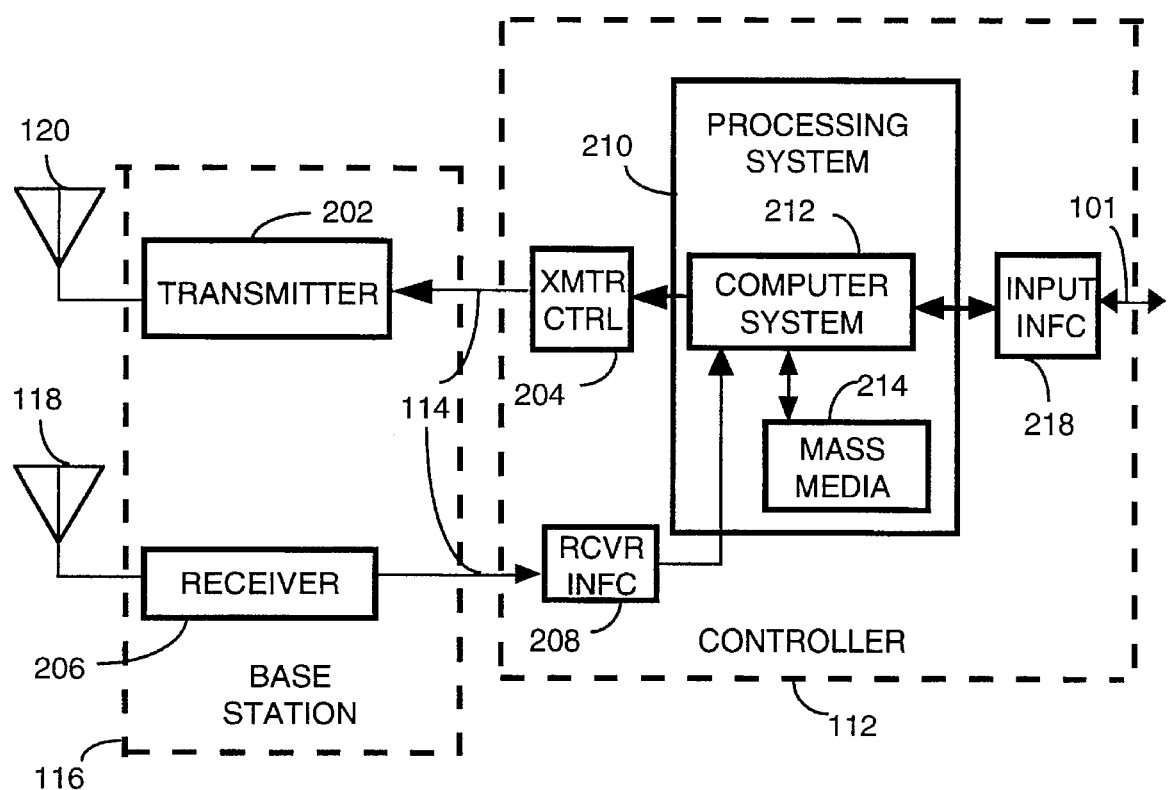
*FIG. 2*
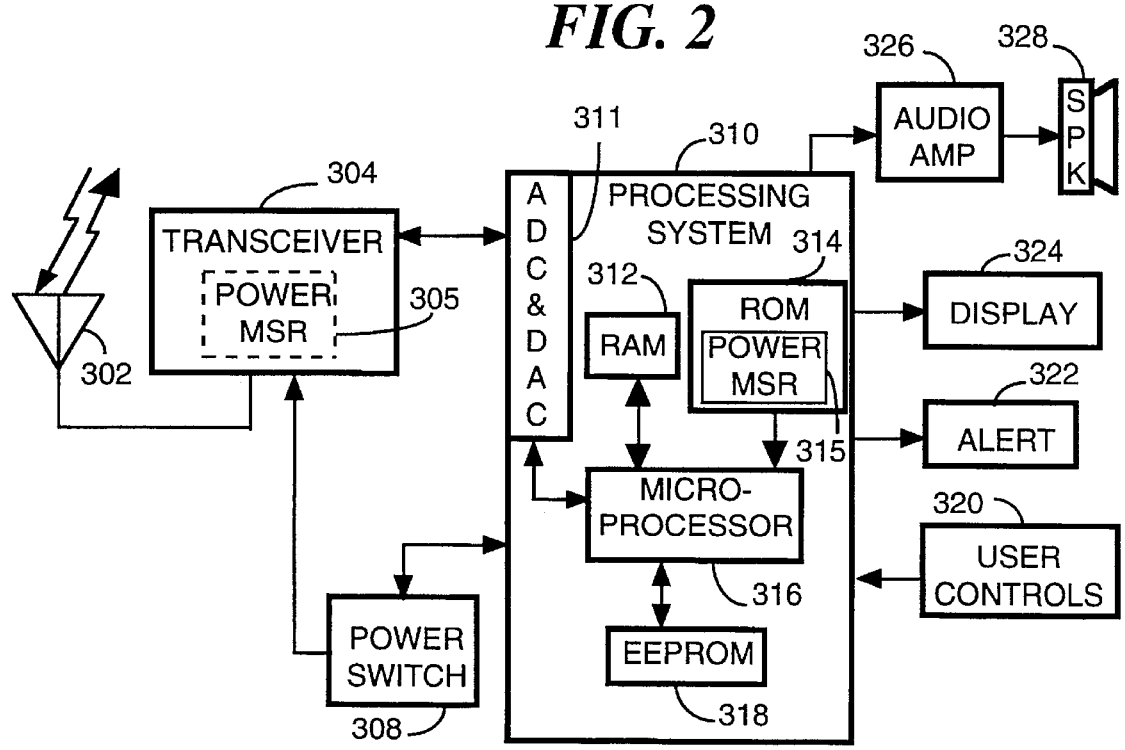
122 *FIG. 3*

400

METHOD AND APPARATUS FOR IMPLEMENTING A RECEIVED SIGNAL QUALITY MEASUREMENT IN A RADIO COMMUNICATION SYSTEM

RELATED APPLICATIONS

Application Ser. No. 08/397,322 filed Feb. 28, 1995 by Gorday et al., entitled "Method and Apparatus for Determining a Quality Level of an Analog Signal in a Radio Communication System."

Application Ser. No. 08/395,747 filed Feb. 28, 1995 by Leitch et al., entitled "Voice Compression Method and Apparatus in a Communication System."

FIELD OF THE INVENTION

This invention relates in general to radio communication systems, and more specifically to a method and apparatus in a radio communication system for implementing a received signal quality measurement.

BACKGROUND OF THE INVENTION

A radio communication system with two-way communication between base stations and portable subscriber units provides an important means for the base stations to determine the reliability of a message transaction. Digital error detection techniques have worked well for prior art systems which use frequency modulation (FM) for digital message communication. Such messages are typically numeric or alpha-numeric messages. With today's technology improvements in speech algorithms and microcomputer processing, the demand for new services which require higher data rates makes standard FM modulation no longer suitable. To resolve this problem, other prior art systems have developed modulation signaling formats, such as mixed signaling systems which use both FM and linear modulation schemes.

Base stations which deliver mixed digital and analog messages to portable subscriber units can no longer rely on digital error detection techniques to determine if the message transaction is reliable. These systems still utilize conventional error detection or error correction techniques for the digital message portion. This, however, only allows the portable subscriber unit to verify that the digital message portion has been received reliably without any indication of the state of the analog message portion.

Thus, what is needed is a method and apparatus in a radio communication system for implementing a received signal quality measurement. In particular, a method and apparatus is needed that can determine the signal quality level of the analog message portion.

SUMMARY OF THE INVENTION

An aspect of the present invention is a method of implementing a received signal quality measurement in a radio communication system for delivering a message portion intended for a portable subscriber unit in a coverage zone of a plurality of coverage zones. The method comprises in a fixed portion of the radio communication system the step of making, for each coverage zone of a group comprising the coverage zone and other coverage zones that are first tier co-channel interferers of the coverage zone, an assignment of a silence slot in one of a plurality of predetermined synchronized signal quality measurement (SQM) slots. The assignment is made such that within the group no two coverage zones have the silence slot assigned to an identical one of the plurality of predetermined synchronized SQM slots. The method further comprises in the fixed portion of the radio communication system the steps of transmitting a silent modulation signal from each of selected ones of the coverage zones of the group in the silence slot assigned thereto, and transmitting a predetermined modulation signal from the selected ones of the coverage zones of the group in a remainder of the plurality of predetermined synchronized SQM slots not assigned thereto as the silence slot, and transmitting from the coverage zone the message portion intended for the portable subscriber unit, wherein the message portion is transmitted proximate the SQM slots.

Another aspect of the present invention is a controller for implementing a received signal quality measurement in a radio communication system for delivering a message comprising a message portion intended for a portable subscriber unit in a coverage zone of a plurality of coverage zones. The controller comprises a processing system for controlling operation of the controller, and an input interface coupled to the processing system for accepting the message from a message originator. The controller further comprises a transmitter controller coupled to the processing system for controlling a plurality of transmitters positioned in the plurality of coverage zones. The processing system is programmed for making, for each coverage zone of a group comprising the coverage zone and other coverage zones that are first tier co-channel interferers of the coverage zone, an assignment of a silence slot in one of a plurality of predetermined synchronized signal quality measurement (SQM) slots. The assignment is made such that within the group no two coverage zones have the silence slot assigned to an identical one of the plurality of predetermined synchronized SQM slots. The processing system is further programmed for controlling the plurality of transmitters to transmit a silent modulation signal from each of selected ones of the coverage zones of the group in the silence slot assigned thereto, and to transmit a predetermined modulation signal from the selected ones of the coverage zones of the group in a remainder of the plurality of predetermined synchronized SQM slots not assigned thereto as the silence slot. The processing system is further programmed for thereafter controlling the plurality of transmitters to transmit from the coverage zone the message portion intended for the portable subscriber unit, wherein the message portion is transmitted proximate the SQM slots.

A third aspect of the present invention is a portable subscriber unit for implementing a received signal quality measurement in a radio communication system for delivering a message comprising a message portion intended for the portable subscriber unit in a coverage zone of a coverage area partitioned into coverage zones. The portable subscriber unit comprises a receiver for receiving transmissions from a group of the coverage zones during a plurality of predetermined synchronized signal quality measurement (SQM) slots, and a processing system coupled to the receiver for controlling operation of the portable subscriber unit. The portable subscriber unit further comprises a power measurement element coupled to the receiver for measuring mean RMS power received in each of the plurality of predetermined synchronized SQM slots, and a transmitter coupled to the processing system for sending acknowledgment responses to a fixed portion of the radio communication system. The processing system is programmed for making a determination of which one of the plurality of predetermined synchronized SQM slots is a home silence slot transmitted from the coverage zone in which the portable subscriber unit is located, the determination made by controlling the power measurement element to examine the mean RMS power received in each of the plurality of predetermined synchronized SQM slots.

A fourth aspect of the present invention is a method of implementing a received signal quality measurement in a radio communication system for delivering a message portion intended for a portable subscriber unit in a coverage zone of a plurality of coverage zones. The method comprises in a fixed portion of the radio communication system the step of making, for each coverage zone of a group comprising the coverage zone and other coverage zones that are first tier co-channel interferers of the coverage zone, a first assignment of a tone slot in one of a plurality of predetermined synchronized signal quality measurement (SQM) slots. The first assignment is made such that within the group no two coverage zones have the tone slot assigned to an identical one of the plurality of predetermined synchronized SQM slots. The method further comprises in a fixed portion of the radio communication system the step of making for all the coverage zones of the group a second assignment of a quiet slot, the quiet slot assigned to a predetermined identical one of the plurality of predetermined synchronized SQM slots for all the coverage zones of the group. The method also includes the step of transmitting a predetermined modulation signal from each of selected ones of the coverage zones of the group in the tone slot assigned thereto, and transmitting a silent modulation signal from the selected ones of the coverage zones of the group in a remainder of the plurality of predetermined synchronized SQM slots not assigned thereto as the tone slot. In addition, the method includes the step of transmitting from the coverage zone the message portion intended for the portable subscriber unit, wherein the message portion is transmitted proximate the SQM slots.

A fifth aspect of the present invention is a portable subscriber unit for implementing a signal quality measurement in a radio communication system for delivering a message portion intended for the portable subscriber unit in a coverage zone of a plurality of coverage zones. The portable subscriber unit comprises a receiver for receiving transmissions from a group of the coverage zones during a plurality of predetermined synchronized signal quality measurement (SQM) slots, and a processing system coupled to the receiver for controlling operation of the portable subscriber unit. The portable subscriber unit further comprises a power measurement element coupled to the receiver for measuring a plurality of powers received in the plurality of predetermined synchronized SQM slots. The processing system is programmed for calculating from the plurality of powers a value representing a total interference plus noise environment for the receiver, and setting in response to calculate the value a threshold for signal power. The threshold is set a predetermined amount above the value. The processing system is further programmed for thereafter receiving the message portion and determining therefrom a power of a signal indicative of the signal power, and choosing between accepting and rejecting the message portion in response to the power determined.

BRIEF DESCRIPTION OF THE DRAWINGS

FIG. 2 is an electrical block diagram of elements of a fixed portion of the radio communication system in accordance with the preferred embodiment of the present invention.

FIG. 3 is an electrical block diagram of a portable subscriber unit in accordance with the preferred embodiment of the present invention.

DESCRIPTION OF THE PREFERRED EMBODIMENT

Figure 1:
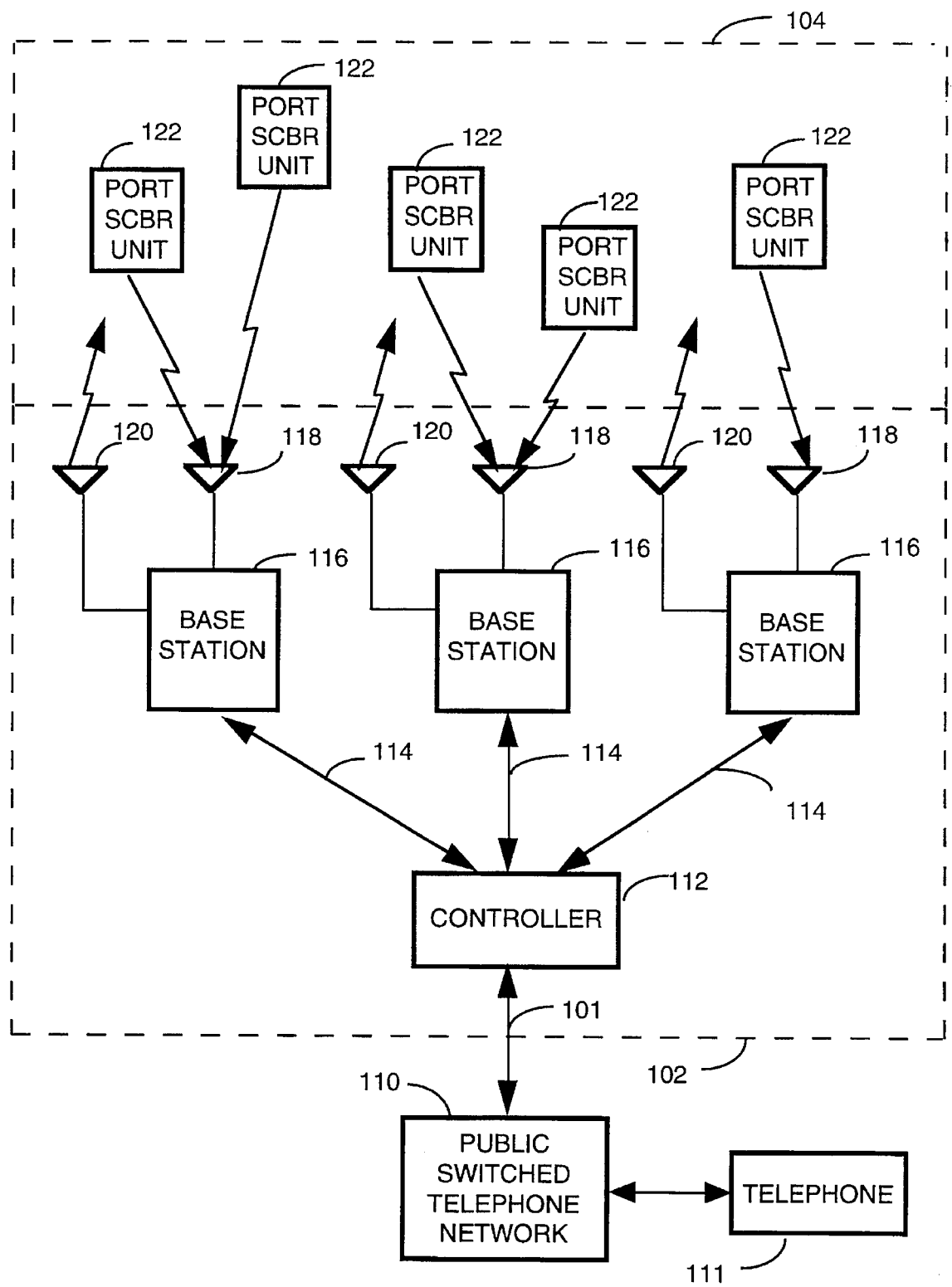
FIG. 1 is an electrical block diagram of a radio communication system in accordance with the preferred embodiment of the present invention.

Referring to FIG. 1, an electrical block diagram of a communication system in accordance with the preferred embodiment of the present invention comprises a fixed portion 102 and a portable portion 104. The fixed portion 102 includes a plurality of base stations 116, for communicating with the portable portion 104, utilizing conventional radio frequency (RF) techniques well known in the art, and coupled by communication links 114 to a controller 112 which controls the base stations 116. The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized for the controller 112 and the base stations 116.

Each of the base stations 116 transmits RF signals to the portable portion 104 comprising a plurality of portable subscriber units 122 via a transmitting antenna 120. The base stations 116 each receive RF signals from the plurality of portable subscriber units 122 via a receiving antenna 118. The RF signals transmitted by the base stations 116 to the portable subscriber units 122 (outbound messages) comprise selective call addresses identifying the portable subscriber unit 122, and data or voice messages originated by a caller. The RF signals transmitted by the portable subscriber units 122 to the base stations 116 (inbound messages) comprise positive acknowledgments (ACKs) which indicate the message was received reliably by the portable subscriber unit 122, or negative acknowledgments (NAKs) which indicate the portable subscriber unit 122 did not receive the message reliably. A detailed description of inbound acknowledge-back messaging is more fully described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call originations therefrom. Selective call originations comprising voice and data messages from the PSTN 110 can be generated, for example, from a conventional telephone 111 coupled to the PSTN 110 in a manner that is well known in the art.

Voice messages transmitted by the base stations 116 utilize mixed signaling techniques. A voice message includes a digital message portion and an analog message portion. The digital message portion includes at least the addressing information which is used to identify the portable subscriber unit 122, and a message vector identifying the location of the analog message. The digital message portion is preferably similar to Motorola's well-known FLEX™ digital selective call signaling protocol as described more fully in U.S. Pat. No. 5,168,493 issued Dec. 1, 1992 to Nelson et al., which is hereby incorporated herein by reference. This protocol utilizes well-known error detection and error correction techniques and is therefore tolerant to bit errors occurring during transmission, provided that the bit errors are not too numerous in any one code word.

Outbound channel transmissions of the digital message portion transmitted by the base stations 116 preferably utilize two and four-level frequency shift keyed (FSK) modulation, operating at sixteen hundred or thirty two hundred symbols-per-second (sps), depending on traffic requirements and system transmission gain. Outbound channel transmissions of the analog message portion transmitted by the base stations 116 preferably utilize single side band (SSB) transmission. A voice message preferably comprises an upper side band (USB), a lower side band (LSB) and a pilot carrier. It will be appreciated that, alternatively, a voice message can comprise the pilot carrier and a single one of the sidebands. A detailed explanation of the preferred analog voice messaging system can be found in application Ser. No. 08/395,747 filed Feb. 28, 1995 by Leitch et al., which is hereby incorporated herein by reference. Inbound channel transmissions from the portable subscribes units 122 to the base stations 116 preferably utilize four-level FSK modulation at a rate of eight hundred bits per second (bps). Inbound channel transmissions preferably occur during predetermined data packet time slots synchronized with the outbound channel transmissions. The outbound and inbound channels preferably operate on separate carrier frequencies utilizing frequency division multiplex (FDM) techniques well known in the art. A detailed description of FDM techniques is more fully described in U.S. Pat. No. 4,875,038 issued to Siwiak et al. It will be appreciated that, alternatively, the outbound and inbound channels can operate on a single carrier frequency using time division duplex (TDD) techniques as described more fully in U.S. Pat. No. 5,168,493 issued to Nelson et al. It will be further appreciated that, alternatively, other signaling protocols, modulation schemes, and transmission rates can be utilized for either or both transmission directions.

Referring to FIG. 2, an electrical block diagram of elements of the fixed portion 102 in accordance with the preferred embodiment of the present invention comprises portions of the controller 112 and the base stations 116. The controller 112 comprises a processing system 210 for directing operation of the controller 112. The processing system 210 preferably is coupled through a transmitter controller 204 to a transmitter 202 via the communication links 114. The communication links 114 use conventional means well known in the art, such as a direct wire line (telephone) link, a data communication link, or any number of radio frequency links, such as a radio frequency (RF) transceiver link, a microwave transceiver link, or a satellite link, just to mention a few. The transmitter 202 transmits two and four-level FSK data messages to the portable subscriber units 122 during a digital message portion, and LSB, USB and a pilot during the analog message portion for voice messages. The processing system 210 is also coupled to at least one receiver 206 through a receiver interface 208 via the communication links 114. The receiver 206 demodulates four-level FSK and is preferably collocated with the base stations 116, as implied in FIG. 2, but can be positioned remote from the base stations 116 to avoid interference from the transmitter 202. The receiver 206 is for receiving one or more acknowledgments (ACKs or NAKs) from the portable subscriber units 122.

The processing system 210 is also coupled to an input interface 218 for communicating with the PSTN 110 through the telephone links 101 for receiving selective call originations. In order to perform the functions (to be described below) necessary in controlling the elements of the controller 112, as well as the elements of the base stations 116, the processing system 210 preferably includes a conventional computer system 212, and conventional mass storage media 214. The conventional mass storage media 214 also includes subscriber user information such as, for example, portable subscriber unit 122 addressing, programming options, etc. The conventional computer system 212 is programmed by way of software included in the conventional mass storage media 214. The conventional computer system 212 preferably comprises a plurality of processors such as VME Sparc processors manufactured by Sun Microsystems, Inc. These processors include memory such as dynamic random access memory (DRAM), which serves as a temporary memory storage device for scratch pad processing such as, for example, storing messages originated by callers using the PSTN 110, processing acknowledgments received from the portable subscriber units 122, and for protocol processing of messages destined for the portable subscriber units 122, just to mention a few. The conventional mass storage media 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210.

Referring to FIG. 3, an electrical block diagram of the portable subscriber unit 122 in accordance with the preferred embodiment of the present invention comprises a transceiver antenna 302 for transmitting RF signals to the base stations 116 and for intercepting RF signals from the base stations 116. The transceiver antenna 302 is coupled to a transceiver 304 that utilizes conventional techniques well known in the art. The RF signals received from the base stations 116 use conventional two and four-level FSK. The RF signals transmitted by the portable subscriber unit 122 to the base stations 116 use four-level FSK. Radio signals received by the transceiver 304 produce demodulated information at the output. The demodulated information is coupled to the input of a processing system 310, which processes outbound messages. Similarly, inbound acknowledgment messages are processed by the processing system 310 and delivered to the transceiver 304 for transmission. A conventional power switch 308, coupled to the processing system 310, is used to control the supply of power to the transceiver 304, thereby providing a battery saving function.

To perform the necessary functions of the portable subscriber unit 122, the processing system 310 includes a microprocessor 316, a RAM 312, a ROM 314, an EEPROM 318, and a combined analog to digital converter (ADC) and digital to analog converter (DAC) 311. Preferably, the microprocessor 316 is similar to the DSP56100 digital signal processor (DSP) manufactured by Motorola, Inc. It will be appreciated that other similar processors can be utilized for the microprocessor 316, and that additional processors of the same or alternate type can be added as required to handle the processing requirements of the processing system 310. It will be appreciated that other types of memory, e.g., EEPROM or FLASH, can be utilized for the ROM 314, as well as the RAM 312. It will be further appreciated that the RAM 312 and the ROM 314, singly or in combination, can be integrated as a contiguous portion of the microprocessor 316.

The microprocessor 316 is programmed by way of the ROM 314 to process incoming messages on the outbound channel, and for creating acknowledgment messages on the inbound channel. During outbound message processing, the microprocessor 316 samples the demodulated signal generated by the transceiver 304 using the ADC portion of the combined ADC and DAC 311 converting the demodulated signal to demodulated data. The microprocessor 316 then decodes an address in the demodulated data of the outbound message, compares the decoded address with one or more addresses stored in the EEPROM 318, and when a match is detected, the microprocessor 316 proceeds to process the remaining portion of the message. Preferably, the ROM 314 includes a power measurement element 315 which instructs the microprocessor 316 in the procedure for performing signal quality measurements during message processing, details of which will be described below. It will be appreciated that, alternatively, a hardware power measurement element 305 included in the transceiver 304 can be used to replace the software implemented power measurement element 315. The hardware power measurement element 305 is preferably one or more received signal strength indicators (RSSI) functionally similar to, for example, the MC13135 RSSI device manufactured by Motorola, Inc. Note each RSSI device measures the mean RMS signal power for the pilot carrier and USB or LSB signals.

Once the microprocessor 316 has processed the message, it stores the message in the RAM 312, and a call alerting signal is generated to alert a user that a message has been received. The call alerting signal is directed to a conventional audible or tactile alerting device 322 for generating an audible or tactile call alerting signal. In addition, the microprocessor 316 is programmed to send these ACK or NAK depending on the quality of the received message. To send the acknowledgment, the microprocessor 316 utilizes the DAC portion of the combined ADC and DAC 311 to modulate the transmitter with the FSK data corresponding to the acknowledgment messages.

The message can be accessed by the user through user controls 320, which provide functions such as lock, unlock, delete, read, etc. More specifically, by the use of appropriate functions provided by the user controls 320, the message is recovered from the RAM 312, and then displayed on a display 324, e.g., a conventional liquid crystal display (LCD), or played out audibly, in the case of a voice message, by the combination of an audio amplifier 326 and a speaker 328.

Figure 4:
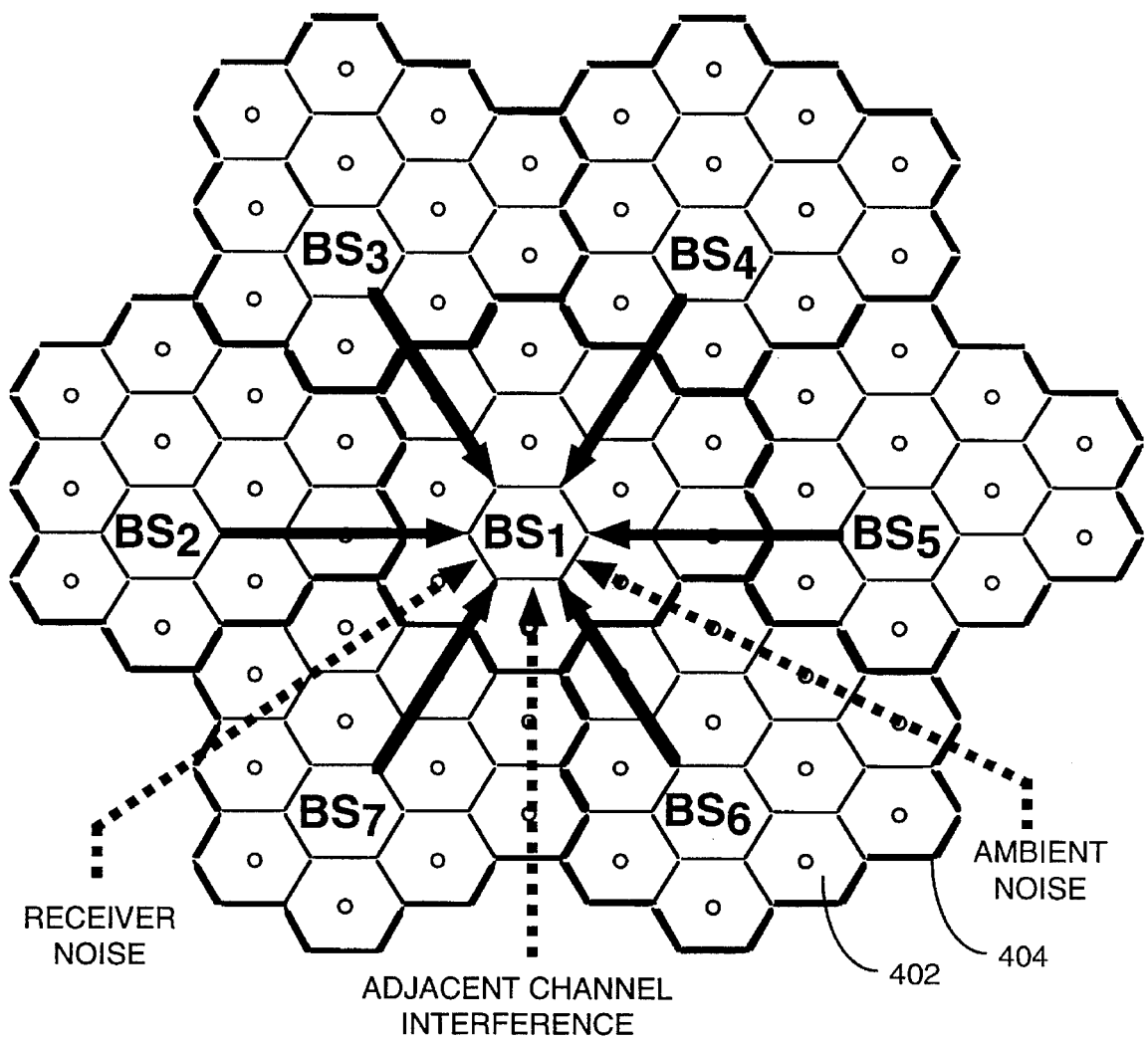
FIG. 4 is a coverage diagram of the radio communication system comprising a plurality of coverage zones grouped in coverage zone clusters in accordance with the preferred embodiment of the present invention.

FIG. 4 is a coverage diagram of the radio communication system comprising a plurality of coverage zones 402 grouped in coverage zone clusters 404 in accordance with the preferred embodiment of the present invention. The coverage zone clusters 404 preferably comprise twelve coverage zones 402. It will be appreciated that, alternatively, more or less coverage zones 402 can be used in the coverage zone clusters 404. Each coverage zone 402 within the coverage zone cluster 404 includes a base station 116 (e.g., $BS_1$). In this example, base station 116 $BS_1$ within the coverage zone 402 has a corresponding set of base stations 116 $BS_2$, $BS_3$, $BS_4$, $BS_5$, $BS_6$, and $BS_7$ within coverage zones 402 of different coverage zone clusters 404 which transmit messages utilizing the same subchannel frequency. Thus, base stations 116 $BS_2$, $BS_3$, $BS_4$, $BS_5$, $BS_6$, and $BS_7$ are first tier co-channel interferers of $BS_1$. The co-channel interference is shown with solid arrows pointed into $BS_1$ from each of the base stations 116 $BS_2$, $BS_3$, $BS_4$, $BS_5$, $BS_6$, and $BS_7$. In addition to co-channel interference, transmissions from $BS_1$ also suffer from adjacent channel interference (shown with a dashed arrow) from base stations 116 in other coverage zones 402 which utilize adjacent subchannel frequencies. Additionally, ambient noise (shown with a dashed arrow) such as, for example, Guassian white noise spread throughout the radio communication system also contributes to the degradation of signals transmitted by $BS_1$. From the point of view of a portable subscriber unit 122 located within the coverage zone 402 of $BS_1$, transmitted signals from $BS_1$ are further degraded by the inherent noise of the receiver portion of the transceiver 304 of the portable subscriber unit 122. It is expected that co-channel interference is the most significant contributor to the degradation of signals transmitted by $BS_1$.

Figure 5:
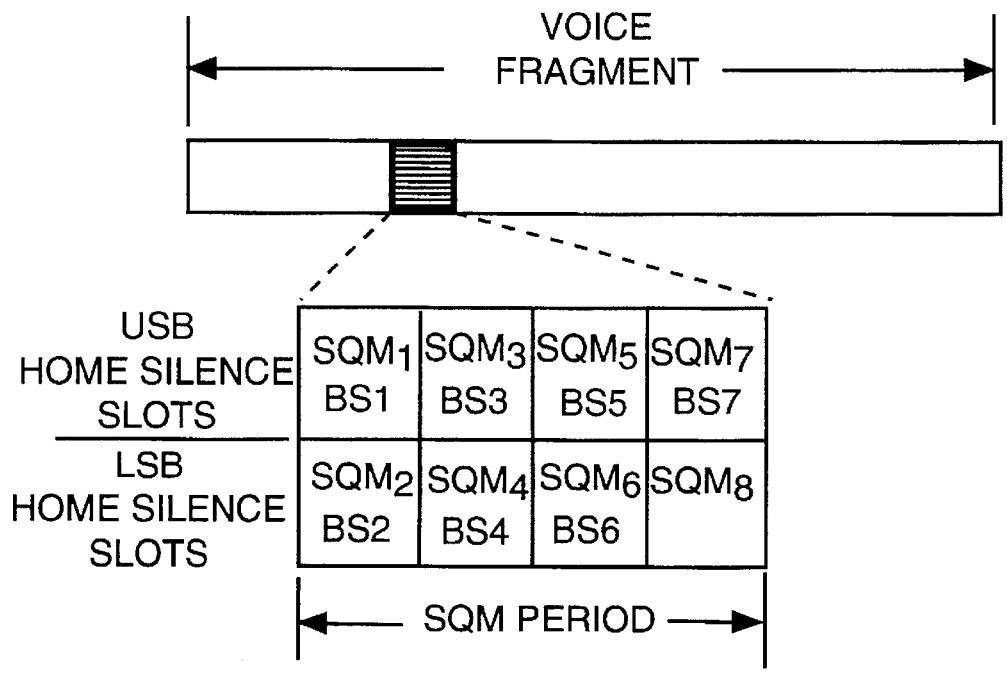
FIGS. 5 and 6 are first and second embodiments of a timing diagram of a plurality of predetermined synchronized signal quality measurement slots transmitted with the analog voice message in accordance with the present invention.

Normally in mixed signaling systems utilizing digital and analog transmission of voice messages, distortion in the transmitted message can be detected in the digital message portion with error detection or correction codes well known in the art. For the analog message portion, however, distortion in the transmitted message cannot readily be detected without some form of a signal quality measurement. FIG. 5 is a timing diagram of a first embodiment of a plurality of predetermined synchronized signal quality measurement (SQM) slots transmitted with an analog voice message in accordance with the present invention. An analog voice message comprises one or more voice fragments. Within each voice fragment an SQM period is reserved for measurements that assist in predicting the signal quality of a received analog voice message. The SQM period comprises SQM slots ($SQM_1$ through $SQM_8$ shown by way of example). Preferably, the SQM slots are transmitted proximate the voice fragment, e.g., before or after the voice fragment and within the same protocol frame as the voice fragment. It will be appreciated that the SQM slots can be transmitted in other positions as well, such as within the voice fragment.

The SQM period is preferably 30 ms in duration, and the SQM slots are preferably 7.5 ms in duration. It will be appreciated that, alternatively, the SQM period and SQM slot duration can be of greater or lesser length than specified depending on the application. Each SQM slot represents analog transmission of an USB, or a LSB and an associated pilot carrier. In addition, each base station 116 is assigned to a side band corresponding to each SQM slot ($BS_1$ through $BS_7$ shown by way of example). The SQM slot assigned to each base station 116 is defined as a home silence slot. Base stations 116 $BS_1$, $BS_3$, $BS_5$, and $BS_7$ are assigned to the USB silence slots while base stations 116 $BS_2$, $BS_4$, and $BS_6$ are assigned to the LSB silence slots. In this example, there is no base station 116 represented by $SQM_8$, thus all base stations 116 transmit a tone in $SQM_8$, as described further below.

In the first embodiment of the present invention, the base stations 116 transmit a tone (e.g., 1 KHz) in all SQM slots excluding their home silence slot. In this embodiment only SQM slots 1 through 8 are utilized. In this method, a portable subscriber unit 122 in the coverage zone 402 of $BS_1$ in the SQM slot assigned to $BS_1$ receives a tone signal from $BS_2$ through $BS_7$. Similarly, in the silence slot assigned to $BS_2$ the portable subscriber unit 122 receives a tone signal from $BS_1$, $BS_3$, $BS_4$, $BS_5$, $BS_6$, and $BS_7$, and so on. Transmitting tones in this manner provides a portable subscriber unit 122 located in the coverage zone 402 of $BS_1$ a method for measuring the co-channel interference from first tier co-channel interferers (i.e., $BS_2$ through $BS_7$), as well as co-channel interferers from higher tiers. This method is applied throughout the radio communication system for all coverage zones 402 and coverage zone clusters 404 simultaneously prior to the transmission of an analog voice message. However, base stations 116 which do not intend to transmit a voice frame remain silent for all tone slots, and thus do not contribute as co-channel interferers during the measurement process. During the simultaneous transmission of all coverage zones 402 and associated coverage zone clusters 404 in the radio communication system, the portable subscriber unit 122 within the coverage zone 402 of $BS_1$, for example, measures interference comprising co-channel interference and adjacent channel interference, plus noise comprising ambient noise and receiver noise of the radio communication system.

The portable subscriber unit 122 is also programmed to determine the home silence slot in cases where the home silence slot location is not provided in the outbound message. In order to determine the home silence slot, the processing system 310 of the portable subscriber unit 122 is programmed to first measure the mean RMS pilot power $P_{mx}$ corresponding to each SQM slot ($P_{m1}$ through $P_{m4}$), and the mean RMS power of the interference plus noise (I+N) for each SQM slot ($I_{m1}$ through $I_{m8}$), all expressed in milli-watts. During the demodulation process of the LSB and USB signals, the processing system 310 of the portable subscriber unit 122 is programmed to divide the side band signals by the mean RMS power of the pilot, thus normalizing variations in the received signals. However, during conditions which degrade the pilot carrier mean power (e.g., fading) dividing the side bands by the mean RMS power of the pilot signal results in an increase of the I+N intercepted by the portable subscriber unit 122. For this reason, during detection of the home silence slot, the demodulated signal is multiplied by the mean pilot power of its corresponding SQM slot resulting in the products $P_{m1}I_{m1}$, $P_{m1}I_{m2}$, $P_{m2}I_{m3}$, $P_{m2}I_{m4}$, $P_{m3}I_{m5}$, $P_{m3}I_{m6}$, $P_{m4}I_{m7}$, and $P_{m4}I_{m8}$. This removes the normalization step, and results in a true comparison of the mean RMS power of the I+N for each SQM slot.

Since $BS_1$ does not transmit a tone in its home silence slot, the lowest product of $P_{mx}I_{mx}$ identifies the home silence slot, which for this example is $P_{m1}I_{m1}$ for a portable subscriber unit 122 residing in the coverage zone 402 of $BS_1$. Once the home silence slot has been identified, the processing system 310 of the portable subscriber unit 122 is programmed to determine a signal quality threshold (T), expressed in dBm, which follows the expression $T=S_d-(V_m-I_m)+P_m$, where $S_d$ is a predetermined minimum desired signal to interference plus noise ratio, expressed in dB, of the signal received by the portable subscriber unit 122, where $V_m$ is a predetermined normal mean RMS power of the analog voice message portion, expressed in dBm, where $I_m$ is the interference plus noise mean RMS power of the home silence slot (in this example, $I_{m1}$), expressed in dBm, and wherein $P_m$ is the mean RMS pilot power measured during the SQM period (in this example, $P_{m1}$) expressed in dBm. The value of $S_d$ is preferably received over-the-air (OTA), and is considered a quality factor defined by the system provider of the radio communication system. The value of $V_m$ is preferably factory programmed into the portable subscriber unit 122. Thus, $S_d$ and $V_m$ are constants.

The equation for T can also be expressed as:

$$T = \frac{S_d \cdot I_m \cdot P_m}{V_m}$$

where $S_d$ is a dimensionless ratio, and T, $I_m$, $P_m$, and $V_m$ are expressed in milli-watts. As discussed above, Sd and Vm are constants, thus the remaining variable for the above equation is $I_m$. For this reason, an increase in $I_m$ results in an increase of T, and a decrease in $I_m$ results in a decrease of T. The threshold equation for T implies that the greater the measured interference plus noise the more pilot signal power is required in the received signal to compensate for the higher interference plus noise. In contrast, the lower the measured interference plus noise, the less pilot signal power is required in the received signal. Since the mean RMS pilot power is expected to track with the mean RMS power of the side bands, T provides a signal quality means to determine the quality of a received signal.

Figure 6:
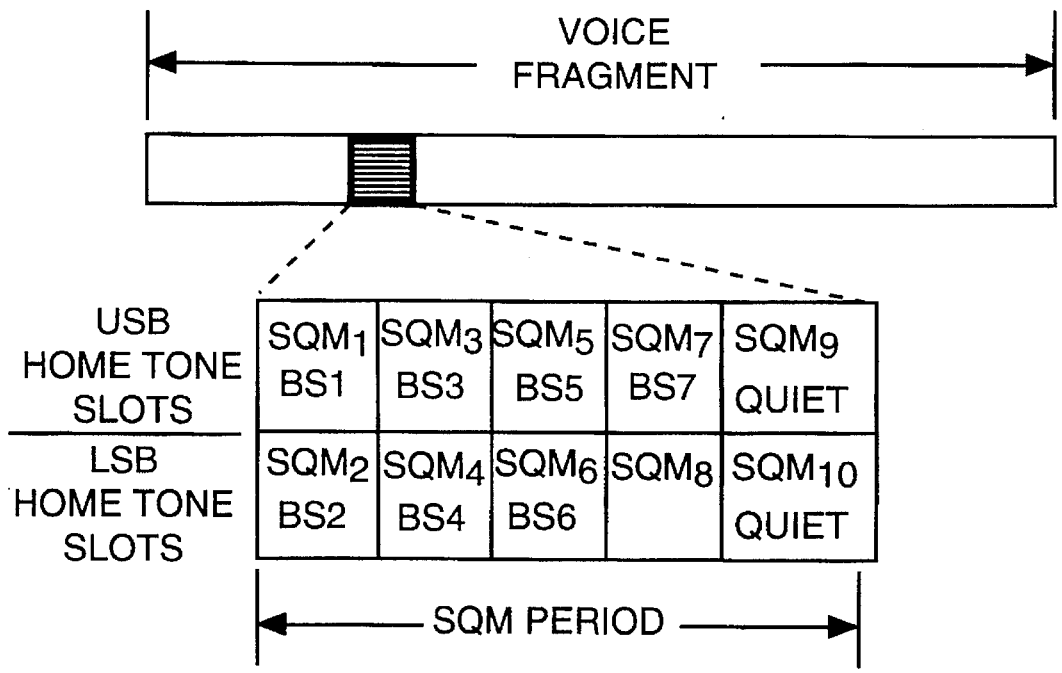

FIG. 6 is a timing diagram of a second embodiment of a plurality of predetermined synchronized signal quality measurement (SQM) slots transmitted with an analog voice message in accordance with the present invention. In the second embodiment of the present invention, the base stations 116 transmit a tone (e.g., 1 KHz) only in a home tone slot. In this arrangement, a portable subscriber unit 122, unaware of the location of its home tone slot, is programmed to measure the mean RMS power of the pilot $P_{mx}$ corresponding to each SQM slot ($P_{m1}$, $P_{m2}$, $P_{m3}$, $P_{m4}$, and $P_{mq}$), and the mean RMS power of the interference plus noise $I_{mx}$ of each tone slot ($I_{m1}$, $I_{m2}$, $I_{m3}$, $I_{m4}$, $I_{m5}$, $I_{m6}$, $I_{m7}$, $I_{m8}$, and $I_{mq}$), all expressed in milli-watts. As was done above, each component of $I_{mx}$ is multiplied with its corresponding $P_{mx}$ to remove the effects of the normalization step (i.e., $P_{m1}I_{m1}$, $P_{m1}I_{m2}$, $P_{m2}I_{m3}$, $P_{m2}I_{m4}$, $P_{m3}I_{m5}$, $P_{m3}I_{m6}$, $P_{m4}I_{m7}$, $P_{m4}I_{m8}$, and $P_{mq}I_{mq}$). Note, since no tones from any base stations 116 are transmitted during the quiet slots no co-channel interference is present, thus $I_{mq}$ represents primarily the noise component. of I+N at the portable subscriber unit 122. Since $BS_1$ transmits a tone in its home tone slot, the highest product of $P_{mx}I_{mx}$ identifies the home tone slot, which for this example is $P_{m1}I_{ml}$ for a portable subscriber unit 122 residing in the coverage zone 402 of $BS_1$. Once the home tone slot has been identified, the portable subscriber unit 122 is programmed to determine from the plurality of powers described above (i.e., $P_{m1}I_{m1}$, $P_{m1}I_{m2}$, $P_{m2}I_{m3}$, $P_{m2}I_{m4}$, $P_{m3}I_{m5}$, $P_{m3}I_{m6}$, $P_{m4}I_{m7}$, $P_{m4}I_{m8}$, and $P_{mq}I_{mq}$) a value representing the total interference plus noise ($I_{mt}$) of its coverage zone 402 which follows the expression:

$$I_{m_t} = \sum_{x=1}^{N} \frac{I_{m_x} \times P_{m_x}}{P_{m_q}} - (N-1)I_{m_q}$$

For a portable subscriber unit 122 located in the coverage zone 402 of $BS_1$, N=7 (i.e., $I_{mx}$ for $BS_2$ through $BS_8$), and $I_{m1}$ is excluded from the calculation. The term $I_{mx}*P_{mx}/P_{mq}$ moves the normalization reference from $P_{mx}$ to $P_{mq}$. Since each $I_{mx}$ includes a noise component comprising ambient noise, adjacent channel interference from other radio communication systems, and inherent noise from the receiver portion of the transceiver 304, the summation of the $I_{mx}$ terms adds a set of unnecessary noise components (in this example, 6 additional noise terms). The term $(N-1)*I_{mq}$ removes the additional noise components since $I_{mq}$ is essentially the noise term present at the portable subscriber unit 122. Once $I_{mt}$ has been determined, the processing system 310 of the portable subscriber unit 122 is programmed to determine, in response to calculating $I_{mt}$, a signal quality threshold (T) for signal power, expressed in dBm, wherein the threshold is set a predetermined amount above $I_{mt}$. The signal quality threshold (T) follows the expression $T=S_d-(V_m-I_{mt})+P_{mq}$, where $S_d$ is a predetermined minimum desired signal to interference plus noise ratio, expressed in dB, of the signal received by the portable subscriber unit 122, where $V_m$ is a predetermined normal mean RMS power of the analog voice message portion, expressed in dBm, where $I_{mt}$ is the determined total interference plus noise mean RMS power, expressed in dBm, and wherein $P_{mq}$ is the mean RMS pilot power measured during the quiet slot, expressed in dBm. The function of this equation follows the description given above for the first embodiment.

The equation for T can also be expressed as:

$$T = \frac{S_d \cdot I_{mt} \cdot P_{mq}}{V_m}$$

where $S_d$ is a dimensionless ratio, $I_{mt}$, $P_{mq}$, and $V_m$ are expressed in milli-watts.

The first and second embodiments discussed above, utilize methods for determining the home tone slot and quiet slot which required multiplication of the interference plus noise $I_{mx}$ with its corresponding pilot signal $P_{mx}$. This procedure removes the normalization introduced by the demodulator. It will be appreciated that, alternatively, this procedure can be avoided by having the demodulator not divide the signal received from the tone slots by the pilot carrier during signal quality measurements. This reading can be utilized to quicken the determination of the home tone slot and quiet slot (second embodiment only). In addition, the equations for T can be determined such that the pilot term is no longer necessary.

Figure 7:
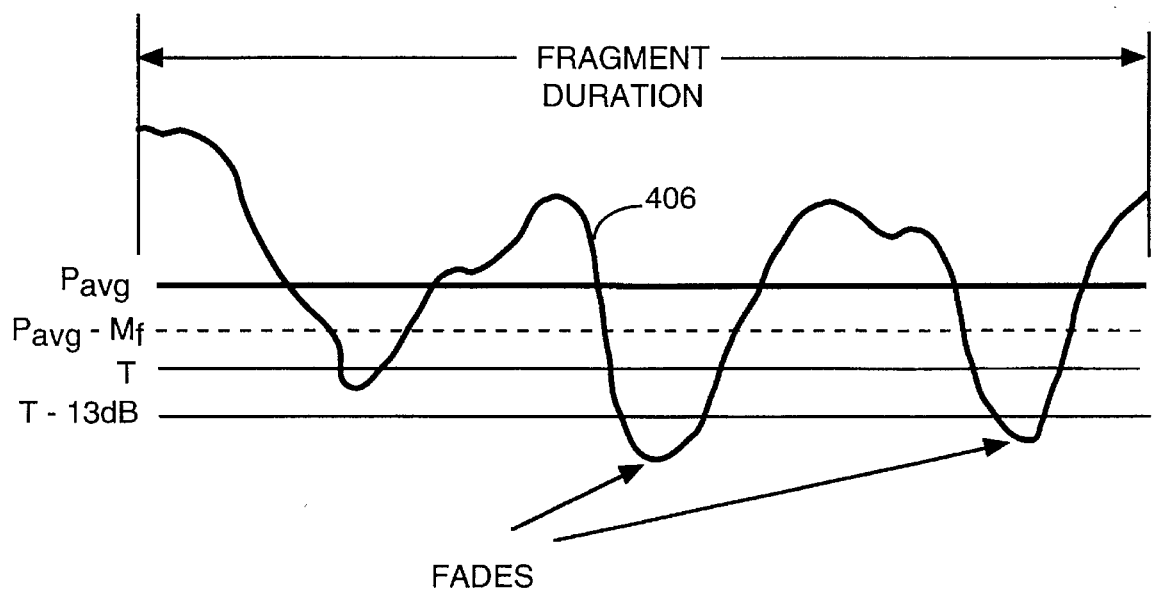
FIG. 7 is a timing diagram representing instantaneous sampling of a plurality of values of pilot carrier power during transmission of the analog voice message, and the measurement thresholds used to determine the quality of the received analog voice message in accordance with the preferred embodiment of the present invention.

FIG. 7 is a timing diagram representing instantaneous sampling of a plurality of values of pilot carrier power during reception of the analog voice message, and the measurement thresholds used to determine the quality of the received analog voice message in accordance with the preferred embodiment of the present invention. The signal 406 represents instantaneous sampling of pilot carrier power. As discussed above, T represents the signal quality threshold tested against the received signal. $P_{avg}$ represents the mean RMS power calculated over a voice fragment, expressed in dBm. To account for fading $P_{avg}$ is subtracted by a fade margin ($M_f$) which preferably follows the expression $$M_f = \min(6, P_f[3+12/R_f]),$$

expressed in dB. This formula is empirically derived. It will be appreciated that, alternatively, another formula derived analytically and/or empirically can be used. $R_f$ represents the number of fades per second more than 13 dB below the threshold T. $P_f$ represents the percent of samples more than 13 dB below the threshold T. FIG. 7 shows two fade crossings (pointed to by arrows) resulting in a fading rate of $$R_f = (2/\text{fragment duration}), \text{ in seconds.}$$

Only two regions of the pilot power samples fall 13 dB below the threshold T. Thus $P_f$ equals the total number of samples 13 dB below T divided by the total sample count over a fragment duration, times one hundred. The fade margin equation is limited to 6 dB, that is, $P_f[3 +12/R_f]$ is capped at 6 dB.

The calculated $M_f$ is subtracted from $P_{avg}$ as shown in FIG. 7, thus bringing $P_{avg}$ closer to the threshold T (i.e., adding a stricter requirement of the quality of the receive signal). As long as $P_{avg}-M_f$ is greater than the threshold T the fragment is deemed of acceptable quality as shown by this example. Once the fragment has been processed, the portable subscriber unit 122 saves the fragment in the RAM 312, and transmits an ACK to the controller 112 confirming a reliable transaction for the fragment. If $P_{avg}$–Mf falls below the threshold T, then the portable subscriber unit 122 discards the fragment, and transmits a NAK to the controller 112 negating the transaction. Once the controller 112 receives the NAK from the portable subscriber unit 122 it reconstructs the fragment and re-transmits it to the portable subscriber unit 122. In the case where multiple fragments are processed by the portable subscriber unit 122, some of which pass the threshold test, and others which fail the threshold test, the ACK and NAK messages include sufficient information to identify the fragments which need re-transmission and those which do not.

Figure 8:
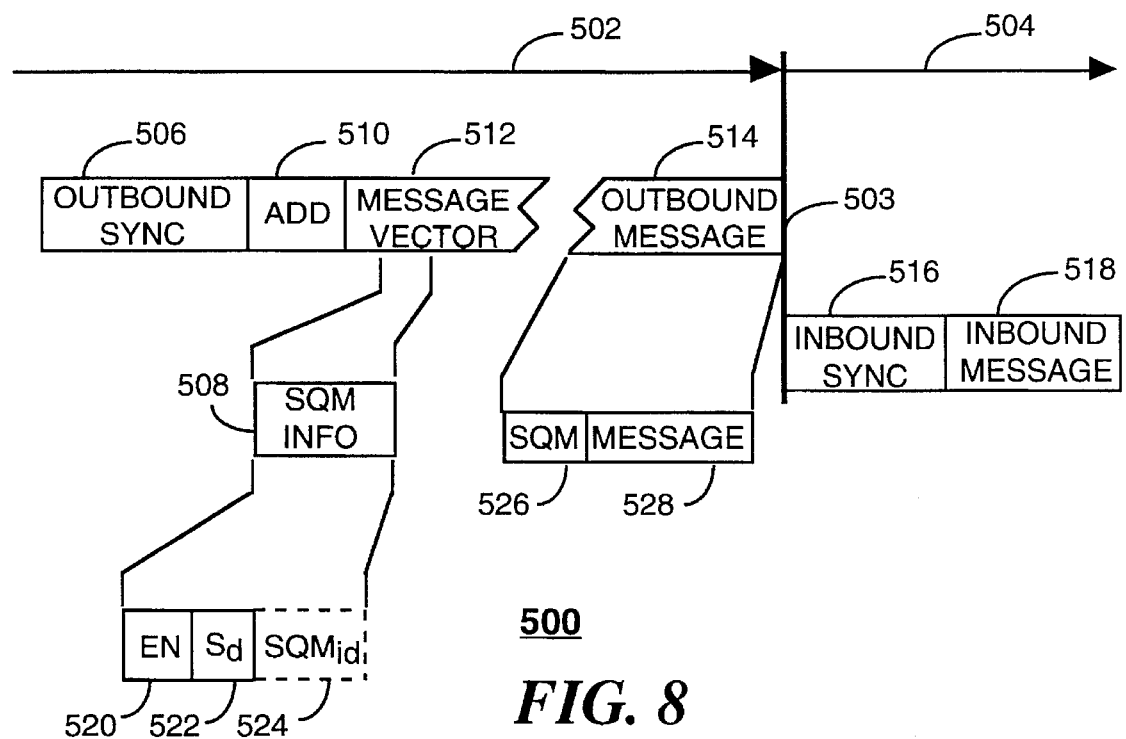
FIG. 8 is a timing diagram of elements of an outbound protocol and an inbound protocol of the fixed and portable portions of the radio communication system in accordance with the preferred embodiment of the present invention.

FIG. 8 is a timing diagram of elements of an outbound protocol and an inbound protocol of the fixed portion 102 and portable portion 104 of the radio communication system in accordance with the preferred embodiment of the present invention. The signaling format operating on the outbound and inbound channels preferably operates on independent frequencies utilizing FDM as described above. Using FDM transmission the outbound RF channel transmission is depicted during an outbound transmission time interval 502, while the inbound RF channel transmission is depicted during an inbound transmission time interval 504. The outbound transmission time interval 502 and the inbound transmission time interval 504 are subdivided by a time boundary 503. The time boundary 503 depicts a point in time before which the outbound transmissions must cease and after which the inbound transmissions can commence.

The elements of the outbound protocol comprise an outbound sync 506, a selective call address 510, a message vector 512 and an outbound message 514, while the inbound protocol comprises an inbound sync 516 and an inbound message 518. The outbound gync 506 provides the portable subscriber unit 122 a means for synchronization utilizing techniques well known in the art. The selective call address 510 identifies the portable subscriber unit 122 for which the outbound message 514 is intended. The message vector 512 points in time within the signal format to the position of the outbound message 514 to be received by the portable subscriber unit 122. In addition, the message vector 512 includes an SQM information field 508. The SQM information field 508 comprises an enable code word 520, and a desired signal to interference plus noise constant $S_d$ 522. The enable code word 520 enables or alternatively disables the signal quality measurement performed by the corresponding portable subscriber unit 122. $S_d$ 522 provides the constant needed in determination of the threshold T equation discussed above. The system provider of the radio communication system preferably defines the desired dB level for $S_d$. In an alternative embodiment of the present invention, the SQM information field 508 also includes an $SQM_{id}$ 524. The $SQM_{id}$ 524 is used to identify the home silence/tone slot assigned to the coverage zone 402 in which the portable subscriber unit 122 is known to be located, which precludes the need to search for the home silence/tone slot. It will be appreciated that, alternatively, the SQM information field 508 can also be located in any other appropriate portion of the outbound message stream within the outbound transmission time interval 502. The outbound message 514 comprises an SQM period 526 and an analog voice message 528. The SQM period 526 utilized for the determination of the threshold T, as described above.

The inbound sync 516 provides the base stations 116 a means for synchronization utilizing techniques well known in the art. The inbound message 518 preferably comprises an address, an ACK, or a NAK. As mentioned above, the ACK and NAK messages include sufficient information to identify the fragments which need re-transmission and those which do not. It will be appreciated that other message acknowledgment schemes can be used to identify valid and invalid fragments.

Figure 9:
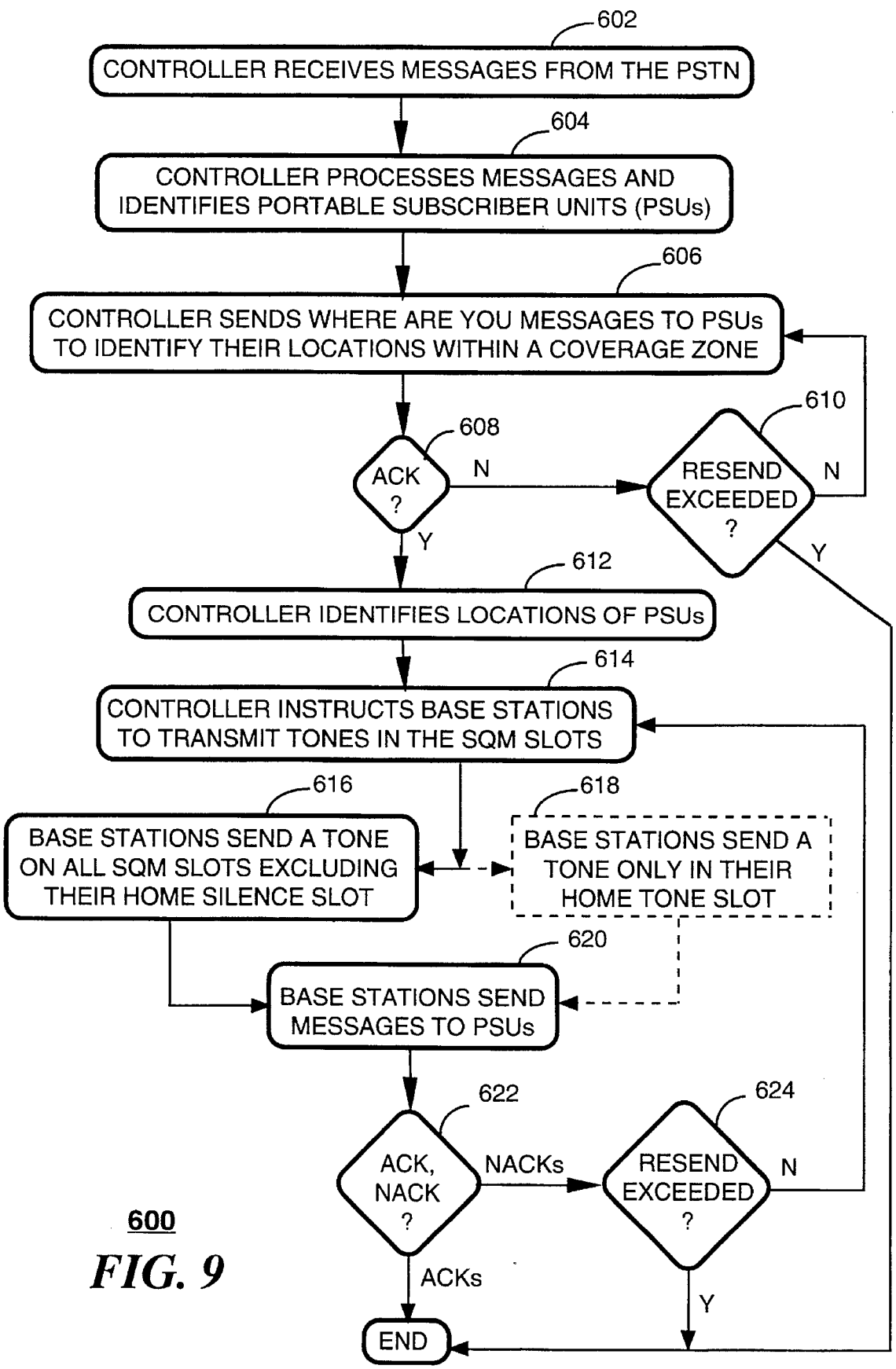
FIG. 9 is a flow chart depicting operation of the fixed portion of the radio communication system in accordance with the preferred embodiment of the present invention.

FIG. 9 is a flow chart depicting operation of the fixed portion 102 of the radio communication system in accordance with the preferred embodiment of the present invention. The flow chart begins with step 602 where the controller 112 receives messages from the PSTN 110 destined for portable subscriber units 122. In step 604 the controller 112 processes the messages and identifies the portable subscriber units 122 identified by pin numbers stored in the mass storage media 214 of the processing system 210 of the controller 112. In step 606 the controller 112 sends where-are-you (WRU) messages transmitted by the base station 116 to the portable subscriber units 122 to identify their locations within one or more coverage zones of the radio communication system. In step 608 the controller 112 waits for acknowledgments from the portable subscriber unit 122 which identifies their coverage zone. For those portable subscriber Units 122 which do not respond, the controller 112 proceeds to step 610 where it determines if a resend count has been exceeded, and if not the WRU message is re-transmitted in step 606. Otherwise, transmission for the non-responsive portable subscriber unit(s) 122 is terminated.

Once the portable subscriber units 122 have been identified by coverage zones in step 612, the controller 112 proceeds to step 614 where it sends instructions to the base station 116 to transmit tones in the SQM slots as prescribed by one of the two embodiments described above for FIG. 5. In the first embodiment the base stations 116 proceed to step 616 where they transmit tones on all SQM slots excluding the home silence slot. In the second embodiment the base stations 116 proceed to step 618 where they transmit a tone only in their home tone slot. As described above, the SQM period occurs simultaneously for all coverage zones throughout the radio communication system. In step 620 the base stations 116 transmit the analog voice message comprising the USB, LSB and pilot. In step 622 the controller 112 waits for an ACK or NAK response from the portable subscriber units 122. For NAKs, the controller 112 proceeds to step 624 where it determines if the NAKed fragments have exceeded their respective resend count. If not, then the controller 112 proceeds to steps 614, 616 (or 618), and 620. Once all fragments have been ACKed, transmission ceases for each corresponding portable subscriber unit 122.

Figure 10:
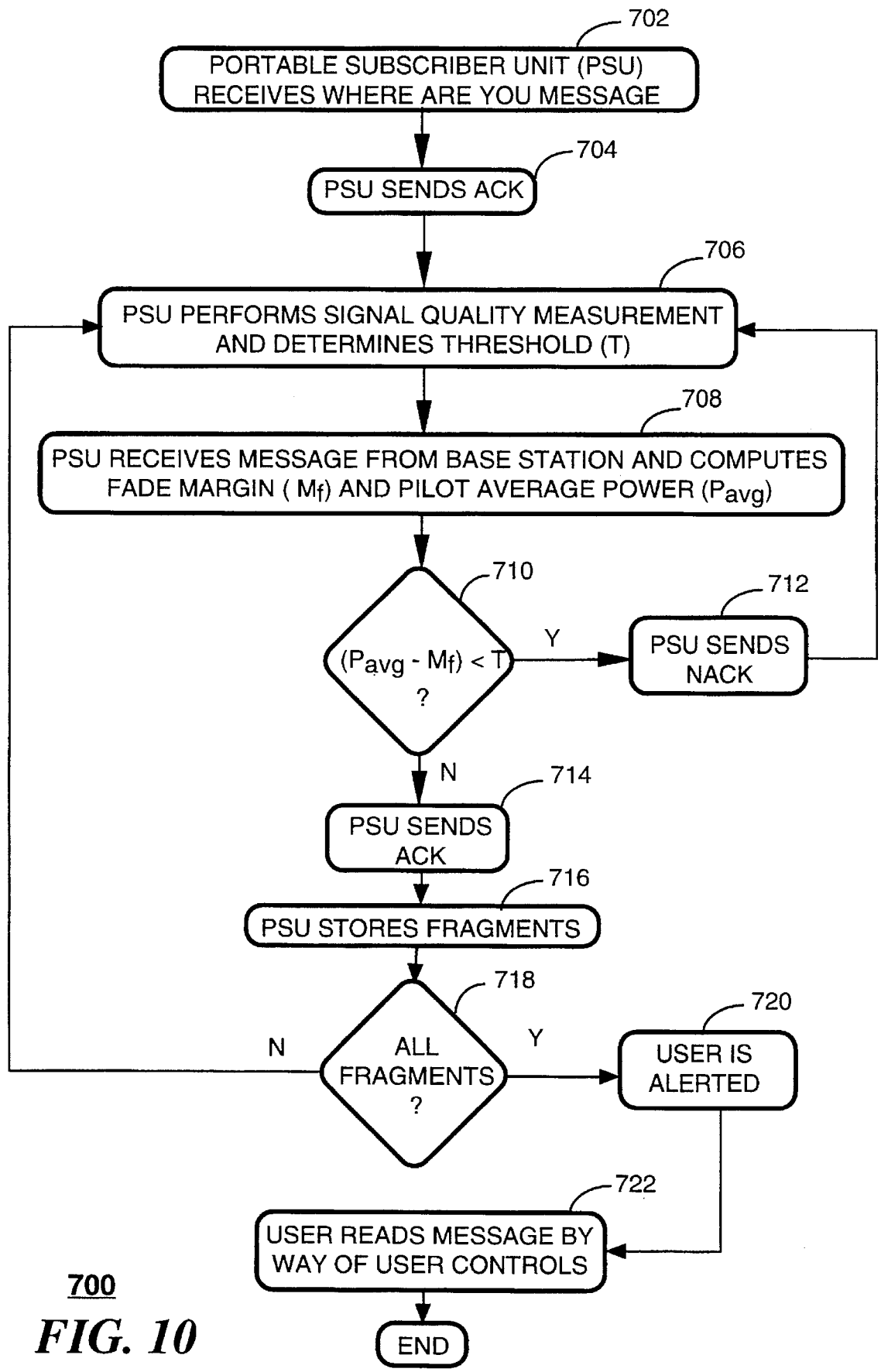
FIG. 10 is a flow chart depicting operation of the portable subscriber unit in accordance with the preferred embodiment of the present invention.

FIG. 10 is a flow chart depicting operation of the portable subscriber unit 122 in accordance with the preferred embodiment of the present invention. The portable subscriber unit 122 begins with step 702 where it receives the WRU message sent by the base stations 116. The portable subscriber unit 122 proceeds to step 704 where it sends an ACK message identifying itself. In step 706 the portable subscriber unit 122 performs a signal quality measurement during the SQM period to determine a threshold T to compare against the pilot carrier received in the expected analog voice message transmitted by the base station 116 after the SQM period. In step 708 the portable subscriber unit 122 computes the mean pilot power of the analog voice message $P_{avg}$, and the fade margin $M_f$ of the pilot based on the equations described above.

In step 710 the portable subscriber unit 122 checks if the difference between $P_{avg}$ and $M_f$ is below T. If it is, then the portable subscriber unit 122 rejects the fragment in step 712 by transmitting a NAK identifying the rejected fragment, and then the flow returns to step 706 to receive and measure another fragment. If $P_{avg}-M_f$ is at or above T, then the portable subscriber unit 122 proceeds to step 714 where it transmits an ACK identifying the fragment. For ACKed fragments the portable subscriber unit 122 continues to step 716 where it stores the fragments in the RAM 312 of the processing system 310. In step 718 the portable subscriber unit 122 checks if all fragments for the analog voice message have been received. If so, then the portable subscriber unit 122 proceeds to step 720 where it alerts the subscriber user by way of the alerting device 322. In step 722 the user invokes the voice message by using appropriate functions provided by the user controls 320. If, however, not all fragments have been received properly for the message, then the portable subscriber unit 122 proceeds to step 706 where it performs the signal quality measurements on the next attempted transmission by the base station 116 of the NAKed fragment(s).

Figure 11:
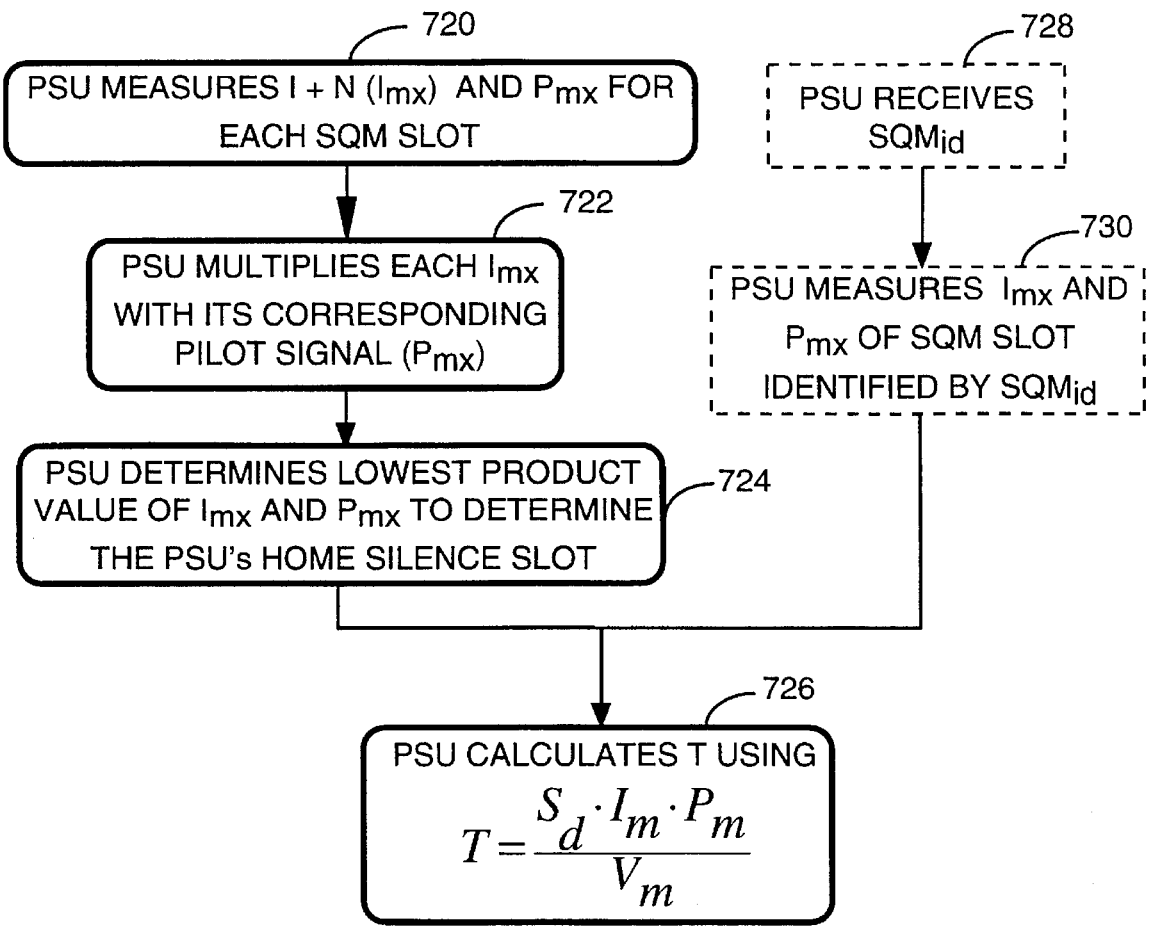
FIG. 11 is a flow chart depicting a first embodiment of the operation performed by the portable subscriber unit to determine a signal quality threshold for the received analog voice message in accordance with the present invention.

FIG. 11 is a flow chart depicting a first embodiment of the operation performed by the portable subscriber unit 122 to determine a signal quality threshold of the receive analog voice message in accordance with the present invention. In this embodiment the portable subscriber unit 122 begins with step 720 where it measures the interference plus noise (I+N, or alternatively $I_{mx}$) for each SQM slot, and the mean RMS pilot power $P_{mx}$ for each SQM slot. In step 722 the portable subscriber unit 122 multiplies each $I_{mx}$ with its corresponding pilot signal $P_{mx}$. In step 724 the portable subscriber unit 122 determines the home silence slot from the lowest product of $I_{mx}$ and $P_{mx}$. In step 726 the portable subscriber unit 122 determines the threshold T, as described above. In an alternative embodiment, the portable subscriber unit 122 receives the $SQM_{id}$ 524 on the outbound channel in step 728 identifying the home silence slot. Consequently, in step 730 the portable subscriber unit 122 measures $I_{mx}$ and $P_{mx}$ of the home silence slot directly, and proceeds to step 726 to determine the threshold T.

Figure 12:
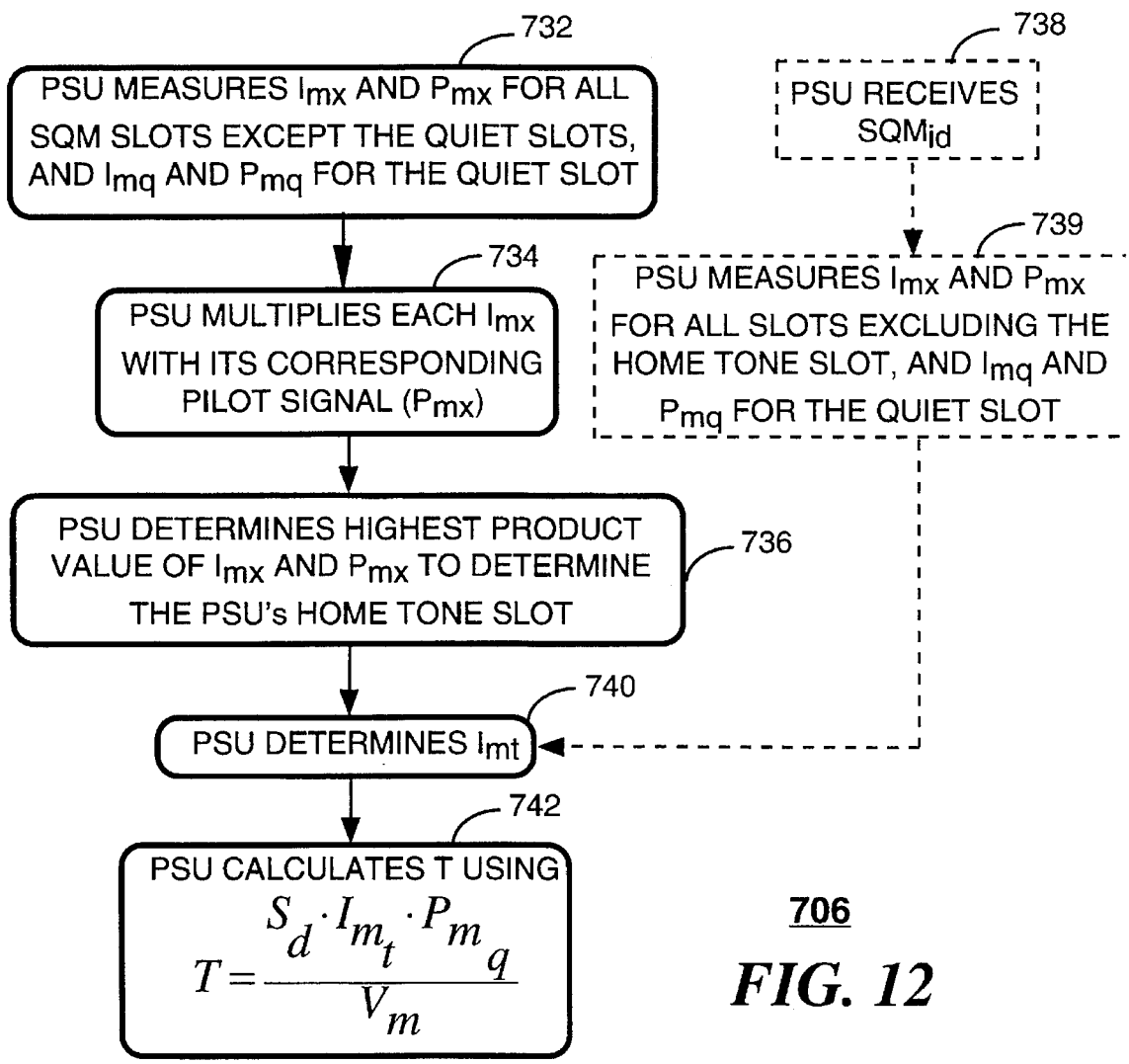
FIG. 12 is a flow chart depicting a second embodiment of the operation performed by the portable subscriber unit to determine a signal quality threshold for the received analog voice message in accordance with the present invention.

FIG. 12 is a flow chart depicting the second embodiment of the operation performed by the portable subscriber unit 122 to determine a signal quality threshold of the receive analog voice message in accordance with the present invention. In this embodiment the portable subscriber unit 122 begins with step 732 where it measures $I_{mx}$, and $P_{mx}$ for each SQM slot, other than the quiet slots, and Imq and Pmq for the quiet slots. In step 734 the portable subscriber unit 122 multiplies each $I_{mx}$ with its corresponding pilot signal $P_{mx}$. In step 736 the portable subscriber unit 122 determines the home tone slot from the highest product of $I_{mx}$ and $P_{mx}$. In step 740 the portable subscriber unit 122 determines the total interference plus noise ($I_{mt}$) utilizing the method and equation described above for the second embodiment. In step 742 the portable subscriber unit 122 determines the threshold T, as described above. It will be appreciated that, alternatively, the portable subscriber unit 122 receives the $SQM_{id}$ 524 on the outbound channel in step 738 identifying the home tone slot. Consequently, in step 739 the portable subscriber unit 122 measures $I_{mx}$ for each tone slot excluding the home tone slot, Pmx for each SQM slot, and Imq and Pmq for the quiet slot. The portable subscriber unit 122 then proceeds to step 740 and 742, as described above.

Thus, it should be apparent by now that the present invention provides a method and apparatus in a radio communication system for implementing a received signal quality measurement on an analog voice message. In particular, the method and apparatus advantageously provides a novel method for determining the signal quality level of an analog voice message, which can be used as a minimum criterion set by a provider for detecting a reliable message transaction between the base stations 116 and the portable subscriber unit 122. In addition, the method and apparatus advantageously provides two novel methods for the fixed portion 102 and portable portion 104 of the radio communication system to perform signal quality measurements prior to the transmission of the analog voice message.

What is claimed is:

1. A method of implementing a received signal quality measurement in a radio communication system for delivering a message portion intended for a portable subscriber unit in a coverage zone of a plurality of coverage zones, the method comprising in a fixed portion of the radio communication system the steps of:

(a) making, for each coverage zone of a group comprising the coverage zone and other coverage zones that are first tier co-channel interferers of the coverage zone, an assignment of a silence slot in one of a plurality of predetermined synchronized signal quality measurement (SQM) slots, wherein the assignment is made such that within the group no two coverage zones have the silence slot assigned to an identical one of the plurality of predetermined synchronized SQM slots;

(b) transmitting a silent modulation signal from each of selected ones of the coverage zones of the group in the silence slot assigned thereto, and transmitting a predetermined modulation signal from the selected ones of the coverage zones of the group in a remainder of the plurality of predetermined synchronized SQM slots not assigned thereto as the silence slot; and (c) transmitting from the coverage zone the message portion intended for the portable subscriber unit, wherein the message portion is transmitted proximate the SQM slots.

2. The method of claim 1, wherein the predetermined modulation signal comprises audio modulation of a predetermined amplitude.

3. The method of claim 1, wherein the selected ones of the coverage zones are coverage zones having a message portion to transmit, and wherein no signal is transmitted in the plurality of predetermined synchronized SQM slots from the coverage zones having no message portion to transmit.

4. The method of claim 1, further comprising in the portable subscriber unit the steps of:

receiving transmissions from the group during the plurality of predetermined synchronized SQM slots;

measuring mean RMS power received in each of the plurality of predetermined synchronized SQM slots; and making a determination of which one of the plurality of predetermined synchronized SQM slots is a home silence slot transmitted from the coverage zone in which the portable subscriber unit is located, the determination made by examining the mean RMS power received in each of the plurality of predetermined synchronized SQM slots.

5. The method of claim 4, wherein the coverage zone utilizes single side band modulation comprising two side bands, each side band corresponding to one of the plurality of predetermined synchronized SQM slots, and wherein step (b) comprises transmitting a pilot carrier from the selected ones of the coverage zones of the group during transmission of the plurality of predetermined synchronized SQM slots and during transmission of the message portion, and wherein the step of making the determination comprises the steps of:

measuring mean RMS power of interference plus noise received in each side band during transmission of each pair of the plurality of predetermined synchronized SQM slots;

measuring mean RMS pilot carrier power received during transmission of each pair of the plurality of predetermined synchronized SQM slots; and selecting as the home silence slot one of the plurality of predetermined synchronized SQM slots corresponding to a smallest one of a plurality of products.

6. The method of claim 5, wherein the mean RMS pilot carrier power measured during the home silence slot selected in the selecting step is defined as $P_m$, and wherein the mean RMS power of interference plus noise received in the home silence slot is defined as $I_m$, and wherein a predetermined minimum desired signal to interference plus noise ratio is defined as $S_d$, expressed as a dimensionless ratio, and wherein a predetermined normal mean RMS power of the message portion is defined to be $V_m$, and wherein the method further comprises in the portable subscriber unit the steps of:

determining a minimum RMS power threshold T for mean RMS pilot carrier power received during transmission of the message portion, wherein $$T = \frac{S_d \cdot I_m \cdot P_m}{V_m},$$

and comparing the minimum RMS power threshold T with the mean RMS pilot carrier power received during transmission of the message portion to choose between sending an acknowledgment (ACK) and sending a negative acknowledgment (NAK), to the fixed portion of the radio communication system in response to the message portion.

7. The method of claim 6, further comprising in the portable subscriber unit the steps of:

sampling a plurality of instantaneous values of pilot carrier power during transmission of the message portion to determine a fading rate $R_f$ for fades of more than a first predetermined amount below the minimum RMS power threshold T, and to determine a percentage $P_f$ of the plurality of instantaneous values of pilot carrier power that fall more than a second predetermined amount below the minimum RMS power threshold T during transmission of the message portion;

calculating a fade margin as a function of $R_f$ and $P_f$; and adjusting the mean RMS pilot carrier power received during transmission of the message portion by the fade margin.

8. The method of claim 1, wherein the coverage zone utilizes single side band modulation comprising two side bands corresponding to a pair of the plurality of predetermined synchronized SQM slots, and wherein step (b) comprises transmitting a pilot carrier from the selected ones of the coverage zones of the group during transmission of the plurality of predetermined synchronized SQM slots and during transmission of the message portion.

9. The method of claim 8, further comprising in the fixed portion of the radio communication system the step of transmitting an identity of one of the plurality of predetermined synchronized SQM slots that is the home silence slot transmitted from the coverage zone in which the portable subscriber unit is located, and further comprising in the portable subscriber unit the steps of:

receiving the identity;

measuring mean RMS power of interference plus noise received in the home silence slot identified by the identity; and measuring mean RMS pilot carrier power received during the home silence slot identified by the identity.

10. The method of claim 9, wherein the mean RMS pilot carrier power received during the home silence slot identified by the identity is defined as $P_m$, and wherein the mean RMS power of interference plus noise received in the home silence slot identified by the identity is defined as $I_m$, and wherein a predetermined minimum desired signal to interference plus noise ratio is defined as $S_d$, expressed as a dimensionless ratio, and wherein a predetermined normal mean RMS power of the message portion is defined to be $V_m$, and wherein the method further comprises in the portable subscriber unit the steps of:

determining a minimum RMS threshold T for mean RMS pilot carrier power received during transmission of the message portion, wherein $T=S_d-(V_m-I_m)+P_m$, and comparing the minimum RMS threshold T with the mean RMS pilot carrier power received during transmission of the message portion to choose between sending an acknowledgment (ACK) and sending a negative acknowledgment (NAK), to the fixed portion of the radio communication system.

11. A controller for implementing a received signal quality measurement in a radio communication system for delivering a message comprising a message portion intended for a portable subscriber unit in a coverage zone of a plurality of coverage zones, the controller comprising:

a processing system for controlling operation of the controller;

an input interface coupled to the processing system for accepting the message from a message originator;

a transmitter controller coupled to the processing system for controlling a plurality of transmitters positioned in the plurality of coverage zones, and a receiver coupled to the processing system for receiving a response from the portable subscriber unit, wherein the processing system is programmed for making, for each coverage zone of a group comprising the coverage zone and other coverage zones that are first tier co-channel interferers of the coverage zone, an assignment of a silence slot in one of a plurality of predetermined synchronized signal quality measurement (SQM) slots, wherein the assignment is made such that within the group no two coverage zones have the silence slot assigned to an identical one of the plurality of predetermined synchronized SQM slots, and wherein the processing system is further programmed for controlling the plurality of transmitters to transmit a silent modulation signal from each of selected ones of the coverage zones of the group in the silence slot assigned thereto, and to transmit a predetermined modulation signal from the selected ones of the coverage zones of the group in a remainder of the plurality of predetermined synchronized SQM slots not assigned thereto as the silence slot, and wherein the processing system is further programmed for thereafter controlling the plurality of transmitters to transmit from the coverage zone the message portion intended for the portable subscriber unit, wherein the message portion is transmitted proximate the SQM slots.

12. The controller of claim 11, wherein the predetermined modulation signal comprises audio modulation of a predetermined amplitude.

13. The controller of claim 11, wherein the selected ones of the coverage zones are coverage zones having a message portion to transmit, and wherein the processing system is further programmed for controlling the plurality of transmitters to transmit no signal in the plurality of predetermined synchronized SQM slots from the coverage zones having no message portion to transmit.

14. A portable subscriber unit for implementing a received signal quality measurement in a radio communication system for delivering a message comprising a message portion intended for the portable subscriber unit in a coverage zone of a coverage area partitioned into coverage zones, the portable subscriber unit comprising:

a receiver for receiving transmissions from a group of the coverage zones during a plurality of predetermined synchronized signal quality measurement (SQM) slots;

a processing system coupled to the receiver for controlling operation of the portable subscriber unit;

a power measurement element coupled to the receiver for measuring mean RMS power received in each of the plurality of predetermined synchronized SQM slots; and a transmitter coupled to the processing system for sending acknowledgment responses to a fixed portion of the radio communication system, wherein the processing system is programmed for making a determination of which one of the plurality of predetermined synchronized SQM slots is a home silence slot transmitted from the coverage zone in which the portable subscriber unit is located, the determination made by controlling the power measurement element to examine the mean RMS power received in each of the plurality of predetermined synchronized SQM slots.

15. The portable subscriber unit of claim 14,
wherein the coverage zone utilizes single side band modulation comprising two side bands, each side band corresponding to one of the plurality of predetermined synchronized SQM slots, and wherein the radio communication system transmits a pilot carrier from selected ones of the coverage zones of the group during transmission of the plurality of predetermined synchronized SQM slots and during transmission of the message portion, and wherein the processing system is further programmed for:
controlling the power measurement element to measure mean RMS power of interference plus noise received in each side band during transmission of each pair of the plurality of predetermined synchronized SQM slots;

controlling the power measurement element to measure mean RMS pilot carrier power received during transmission of each pair of the plurality of predetermined synchronized SQM slots;

multiplying the mean RMS power of interference plus noise received in each of the plurality of predetermined synchronized SQM slots, by the mean RMS pilot carrier power received in a corresponding one of the plurality of predetermined synchronized SQM slots, thereby generating a plurality of products; and selecting as the home silence slot one of the plurality of predetermined synchronized SQM slots corresponding to a smallest one of the plurality of products.

16. The portable subscriber unit of claim 15,
wherein mean RMS pilot carrier power received during the home silence slot selected by the processing system is defined as $P_m$, and wherein mean RMS power of interference plus noise received in the home silence slot is defined as $I_m$, and wherein a predetermined minimum desired signal to interference plus noise ratio is defined as $S_d$, expressed as a dimensionless ratio, and wherein a predetermined normal mean RMS power of the message portion is defined to be $V_m$, and wherein the processing system is further programmed for:
determining a minimum RMS power threshold T for mean RMS pilot carrier power received during transmission of the message portion, wherein $$T = \frac{S_d \cdot I_m \cdot P_m}{V_m},$$

and
comparing the minimum RMS power threshold T with mean RMS pilot carrier power received during transmission of the message portion to choose between sending via the transmitter an acknowledgment (ACK) and sending a negative acknowledgment (NAK), to the fixed portion of the radio communication system in response to the message portion.

17. The portable subscriber unit of claim 16, wherein the processing system is further programmed for:
controlling the power measurement element to sample a plurality of instantaneous values of pilot carrier power during transmission of the message portion to determine a fading rate $R_f$ for fades of more than a first predetermined amount below the minimum RMS power threshold T, and to determine a percentage $P_f$ of the plurality of instantaneous values of pilot carrier power that fall more than a second predetermined amount below the minimum RMS power threshold T during transmission of the message portion;

calculating a fade margin as a function of $R_f$ and $P_f$; and adjusting the mean RMS pilot carrier power received during transmission of the message portion by the fade margin.

18. The portable subscriber unit of claim 14, wherein the coverage zone utilizes single side band modulation comprising two side bands corresponding to a pair of the plurality of predetermined synchronized SQM slots, and wherein the fixed portion of the radio communication system transmits a pilot carrier from selected ones of the coverage zones of the group during transmission of the plurality of predetermined synchronized SQM slots and during transmission of the message portion, and wherein the fixed portion further transmits an identity of one of the plurality of predetermined synchronized SQM slots that is the home silence slot transmitted from the coverage zone in which the portable subscriber unit is located, and wherein the processing system is further programmed for:

controlling the receiver for receiving the identity;

controlling the power measurement element for measuring mean RMS power of interference plus noise received in the home silence slot identified by the identity; and controlling the power measurement element for measuring mean RMS pilot carrier power received during the home silence slot identified by the identity.

19. The portable subscriber unit of claim 18,
wherein the mean RMS pilot carrier power received during the home silence slot identified by the identity is defined as $P_m$, and wherein the mean RMS power of interference plus noise received in the home silence slot identified by the identity is defined as $I_m$, and wherein a predetermined minimum desired signal to interference plus noise ratio is defined as $S_d$, expressed as a dimensionless ratio, and wherein a predetermined normal mean RMS power of the message portion is defined to be $V_m$, and wherein the processing system is further programmed for:
determining a minimum RMS power threshold T for mean RMS pilot carrier power received during transmission of the message portion, wherein $$T = \frac{S_d \cdot I_m \cdot P_m}{V_m},$$

and
comparing the minimum RMS power threshold T with the mean RMS pilot carrier power received during transmission of the message portion to choose between sending an acknowledgment (ACK) and sending a negative acknowledgment (NAK), to the fixed portion of the radio communication system.

20. A method of implementing a received signal quality measurement in a radio communication system for delivering a message portion intended for a portable subscriber unit in a coverage zone of a plurality of coverage zones, the method comprising in a fixed portion of the radio communication system the steps of:

(a) making, for each coverage zone of a group comprising the coverage zone and other coverage zones that are first tier co-channel interferers of the coverage zone, a first assignment of a tone slot in one of a plurality of predetermined synchronized signal quality measurement (SQM) slots, wherein the first assignment is made such that within the group no two coverage zones have the tone slot assigned to an identical one of the plurality of predetermined synchronized SQM slots;

(b) making for all the coverage zones of the group a second assignment of a quiet slot, the quiet slot assigned to a predetermined identical one of the plurality of predetermined synchronized SQM slots for all the coverage zones of the group;

(c) transmitting a predetermined modulation signal from each of selected ones of the coverage zones of the group in the tone slot assigned thereto, and transmitting a silent modulation signal from the selected ones of the coverage zones of the group in a remainder of the plurality of predetermined synchronized SQM slots not assigned thereto as the tone slot; and (d) transmitting from the coverage zone the message portion intended for the portable subscriber unit, wherein the message portion is transmitted proximate the SQM slots.

21. The method of claim 20, wherein the predetermined modulation signal comprises audio modulation of a predetermined amplitude.

22. The method of claim 20, wherein the selected ones of the coverage zones are coverage zones having a message portion to transmit, and wherein no signal is transmitted in the plurality of predetermined synchronized SQM slots from the coverage zones having no message portion to transmit.

23. The method of claim 20, further comprising in the portable subscriber unit the steps of:

receiving transmissions from the group during the plurality of predetermined synchronized SQM slots;

measuring mean RMS power received in each of the plurality of predetermined synchronized SQM slots; and making a determination of which one of the plurality of predetermined synchronized SQM slots is a home tone slot transmitted from the coverage zone in which the portable subscriber unit is located, the determination made by examining the mean RMS power received in each of the plurality of predetermined synchronized SQM slots.

24. The method of claim 23, wherein the coverage zone utilizes single side band modulation comprising two side bands, each side band corresponding to one of the plurality of predetermined synchronized SQM slots, and wherein step (c) comprises transmitting a pilot carrier from the selected ones of the coverage zones of the group during transmission of the plurality of predetermined synchronized SQM slots and during transmission of the message portion, and wherein the step of making the determination comprises the steps of:

measuring mean RMS power of interference plus noise received in each side band during transmission of each pair of the plurality of predetermined synchronized SQM slots;

measuring mean RMS pilot carrier power received during transmission of each pair of the plurality of predetermined synchronized SQM slots;

multiplying the mean RMS power of interference plus noise received in each of the plurality of predetermined synchronized SQM slots, by the mean RMS pilot carrier power received in a corresponding one of the plurality of predetermined synchronized SQM slots, thereby generating a plurality of products; and selecting as the home tone slot one of the plurality of predetermined synchronized SQM slots corresponding to a largest one of the plurality of products.

25. The method of claim 24, wherein the mean RMS pilot carrier power and the mean RMS power of interference plus noise measured in an $X^{th}$ one of the SQM slots, excluding the home tone slot, are defined, respectively, as $P_{m_x}$ and $I_{m_x}$, and wherein mean RMS pilot carrier power measured during the quiet slot is defined as $P_{m_q}$, and wherein mean RMS power of interference plus noise measured in the quiet slot is defined as $I_{m_q}$, and wherein, excluding the home tone slot, and the quiet slot, there are a total of N SQM slots, and wherein total noise pitts interference $I_{m_t}$ is defined by:

$$I_{m_t} = \sum_{x=1}^{N} \frac{I_{m_x} \times P_{m_x}}{P_{m_q}} - (N-1)I_{m_q},$$

and wherein a predetermined minimum desired signal to interference plus noise ratio is defined as $S_d$, expressed as a dimensionless ratio, and wherein a predetermined normal mean RMS power of the message portion is defined to be $V_m$, and wherein the method further comprises in the portable subscriber unit the steps of:

determining a minimum RMS power threshold T for mean RMS pilot carrier power received during transmission of the message portion, wherein $$T = \frac{S_d \cdot I_{m_t} \cdot P_{m_q}}{V_m},$$

and comparing the minimum RMS power threshold T with the mean RMS pilot carrier power received during transmission of the message portion to choose between sending an acknowledgment (ACK) and sending a negative acknowledgment (NAK), to the fixed portion of the radio communication system in response to the message portion.

26. A portable subscriber unit for implementing a signal quality measurement in a radio communication system for delivering a message portion intended for the portable subscriber unit in a coverage zone of a plurality of coverage zones, the portable subscriber unit comprising:

a receiver for receiving transmissions from a group of the coverage zones during a plurality of predetermined synchronized signal quality measurement (SQM) slots;

a processing system coupled to the receiver for controlling operation of the portable subscriber unit; and a power measurement element coupled to the receiver for measuring a plurality of powers received in the plurality of predetermined synchronized SQM slots, wherein the processing system is programmed for:

calculating from said plurality of powers a value representing a total interference plus noise environment for the receiver;

setting in response to calculating said value a threshold for signal power, wherein the threshold is set a predetermined amount above said value;

thereafter receiving the message portion and determining therefrom a power of a signal indicative of said signal power; and choosing between accepting and rejecting the message portion in response to said power determined.

27. The portable subscriber unit of claim 26, wherein the message portion is transmitted as a single side band modulated signal including a pilot carrier, and wherein the signal indicative of said signal power during reception of the message portion comprises the pilot carrier.

\* \* \* \* \*

UNITED STATES PATENT AND TRADEMARK OFFICE
CERTIFICATE OF CORRECTION

| | | |
|---|---|---|
| PATENT NO. | : | 5,606,729 |
| DATED | : | February 25, 1997 |
| INVENTOR(S) | : | Thomas V. D'Amico<br>Jheroen Dorenbosch |

It is certified that error appears in the above-indentified patent and that said Letters Patent is hereby corrected as shown below:

Claim 25, line 22, delete "pitts" and add --plus--.

Signed and Sealed this

Twenty-eighth Day of July, 1998

Attest:

Attesting Officer

BRUCE LEHMAN

Commissioner of Patents and Trademarks